United States Patent [19]

Harriau et al.

[11] 4,339,654
[45] Jul. 13, 1982

[54] METHODS FOR THE MANUFACTURE OF HEAT EXCHANGER PANELS

[75] Inventors: Robert R. Harriau, Old Greenwich; Humfrey N. Udall, Darien, both of Conn.

[73] Assignee: Thermatool Corp., Stamford, Conn.

[21] Appl. No.: 122,467

[22] Filed: Feb. 19, 1980

[51] Int. Cl.³ .............................................. B23K 11/32
[52] U.S. Cl. ................................. 219/107; 219/78.15; 228/160
[58] Field of Search ............................. 219/107, 78.15; 228/137 D, 160

[56] References Cited

U.S. PATENT DOCUMENTS

| | | | |
|---|---|---|---|
| 2,631,361 | 3/1953 | Wallace | 219/160 |
| 3,630,429 | 12/1971 | Matsuda | 228/160 X |
| 3,737,996 | 6/1973 | Orts | 228/160 X |
| 4,136,272 | 1/1979 | Rudd | 219/107 |
| 4,277,871 | 7/1981 | Udall . | |

Primary Examiner—Elliot A. Goldberg
Attorney, Agent, or Firm—Brooks, Haidt, Haffner & Delahunty

[57] ABSTRACT

Method and apparatus for manufacturing heat exchanger elements in which metal tubing and metal strip are advanced toward each other to a weld station where they are welded together and the tubing-strip combination are then advanced through a first tube straightener, pulling apparatus, a strip corrugator and second tube straightener. The tubing is also passed through tube straightening and shaping apparatus in advance of the weld point. If the combination is collected after leaving the second straightener, the apparatus which is downstream of the weld point other than the pulling apparatus, is inoperative during the advance of the combination therethrough but the combination is then advanced in the reverse direction through such apparatus which is then operative and cut-off apparatus intermediate the weld point and the first straightener cut the combination into panel element lengths which are transferred to further processing apparatus. Alternatively, all the apparatus is operative during the first advance of the combination and the combination is cut into panel element lengths after leaving the second straightener, the elements being transferred to the processing apparatus. If corrugation of the strip is not required, the corrugator is not used in either embodiment.

7 Claims, 10 Drawing Figures

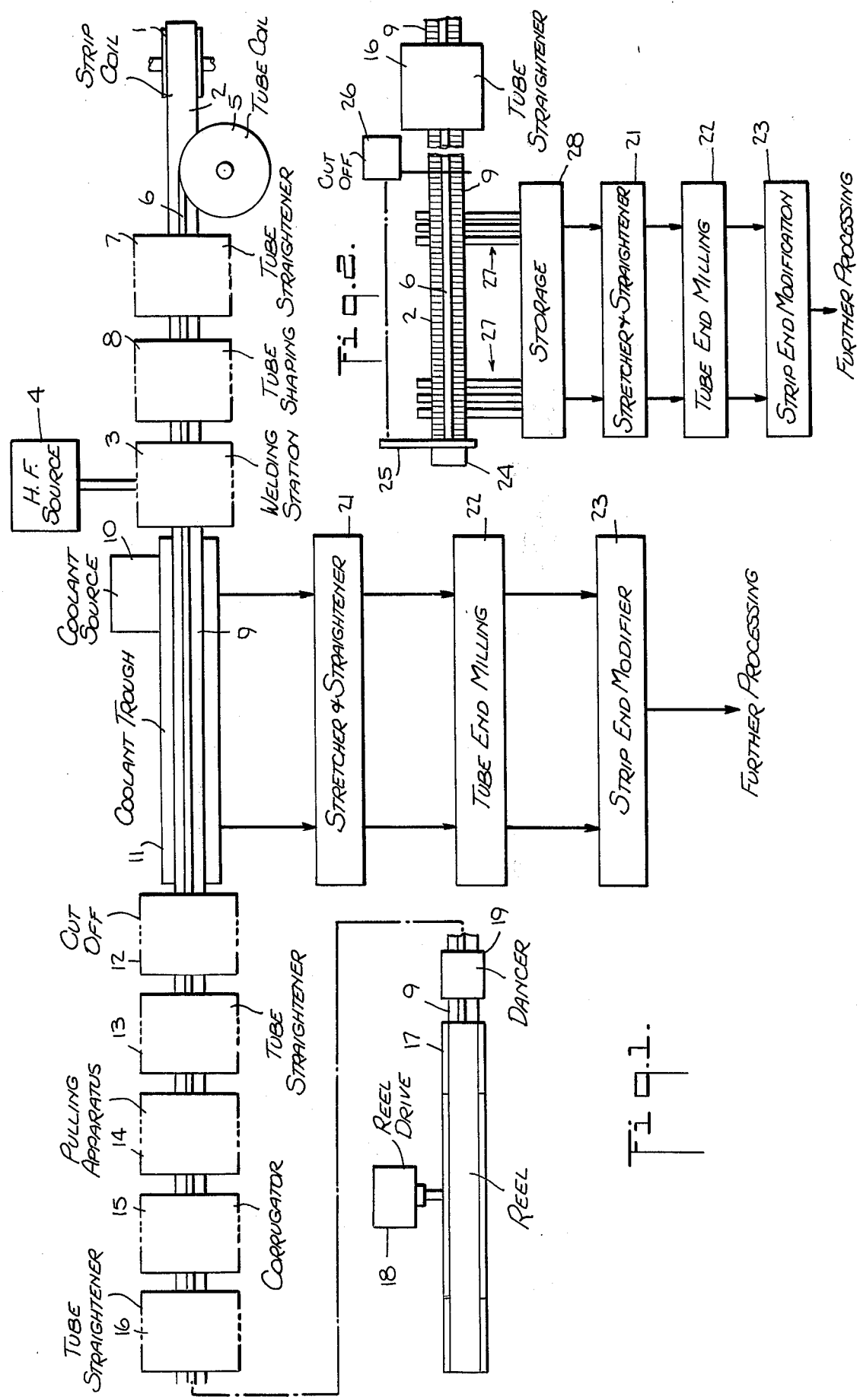

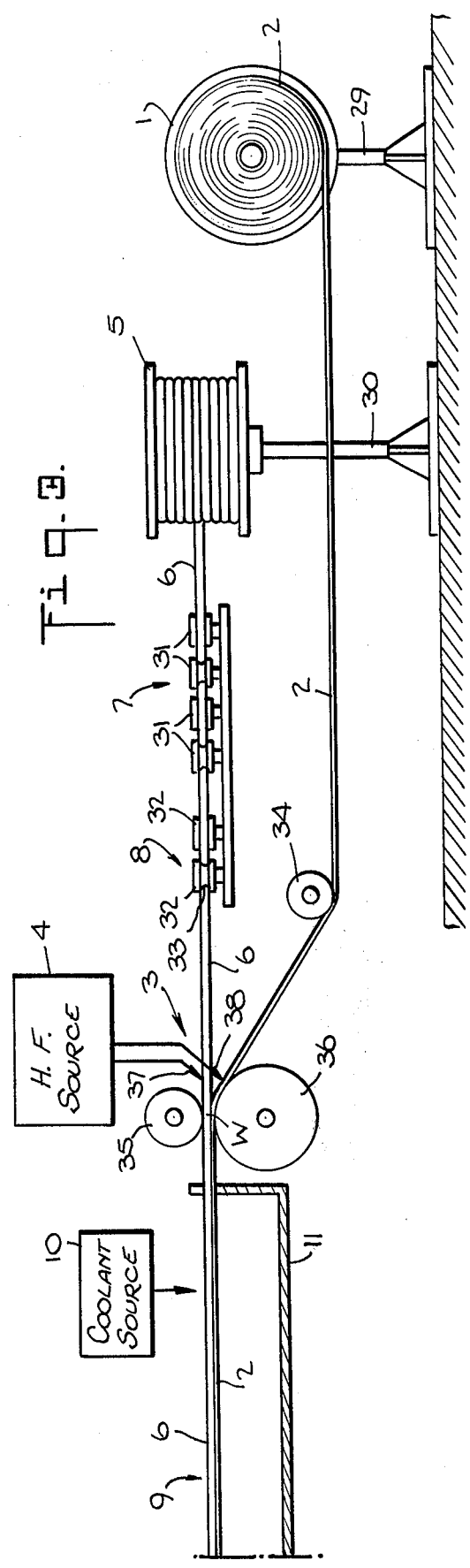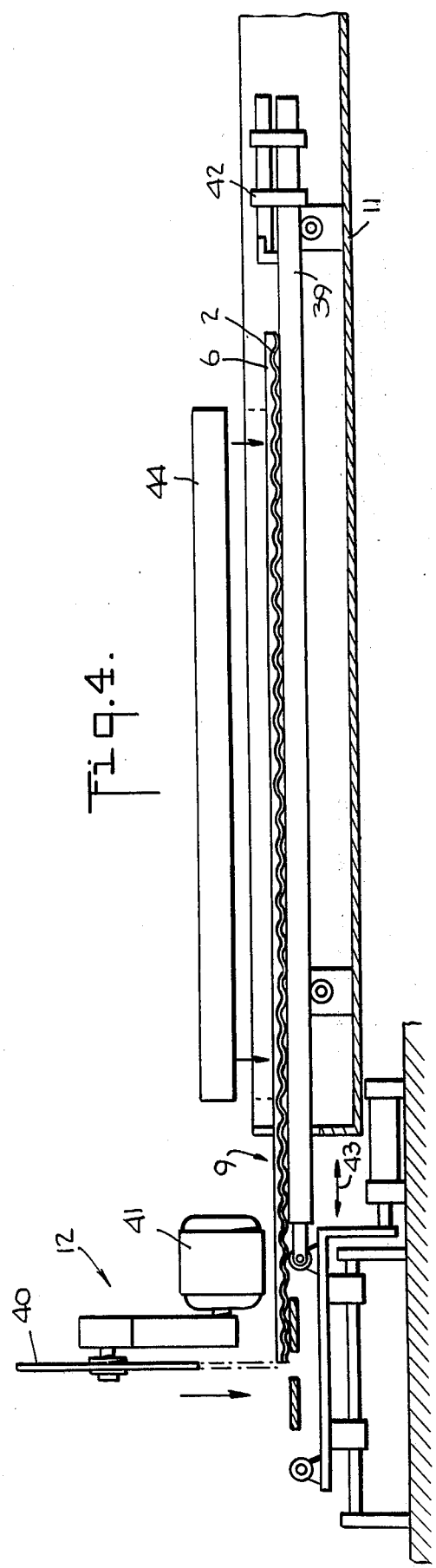

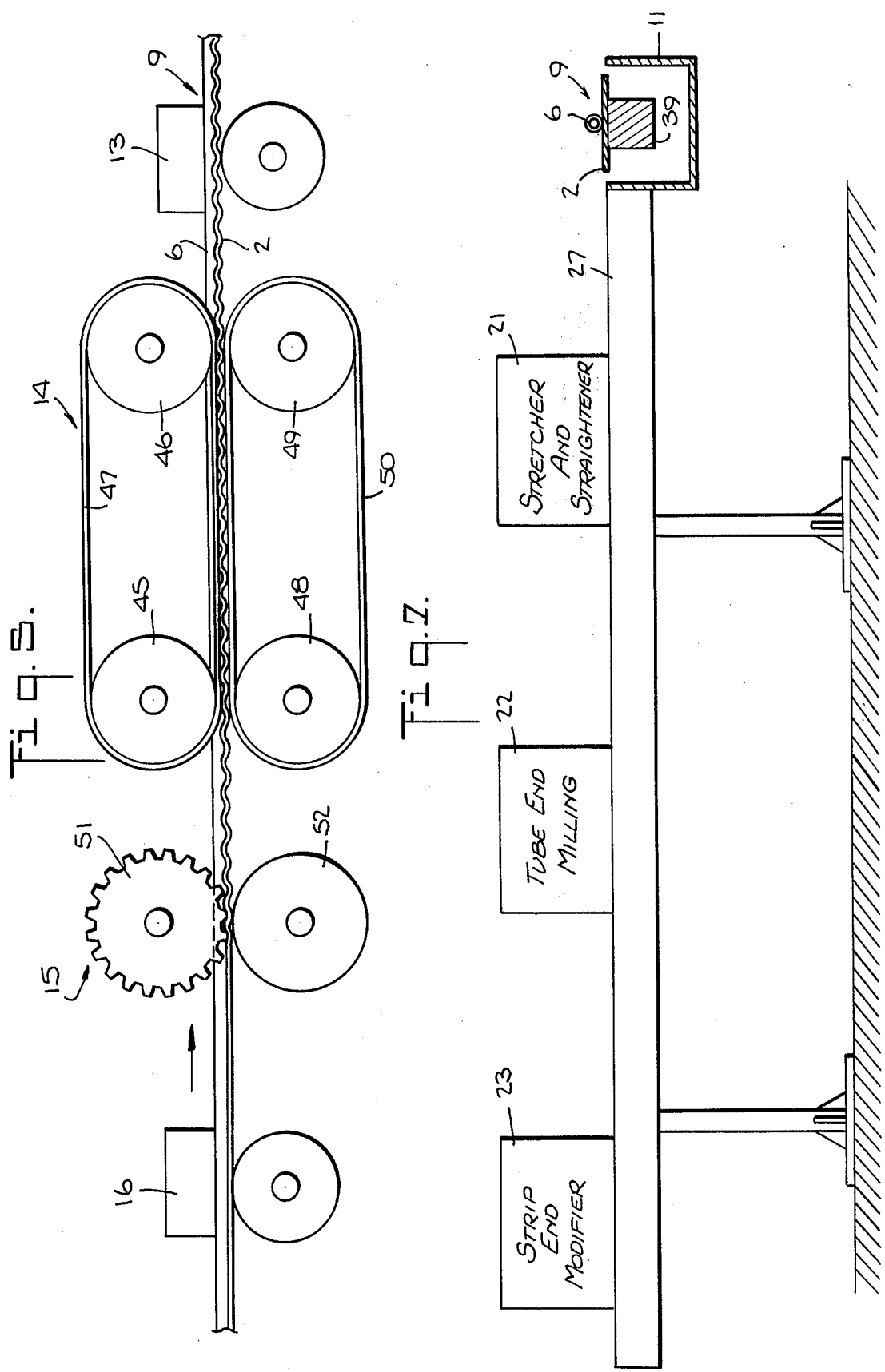

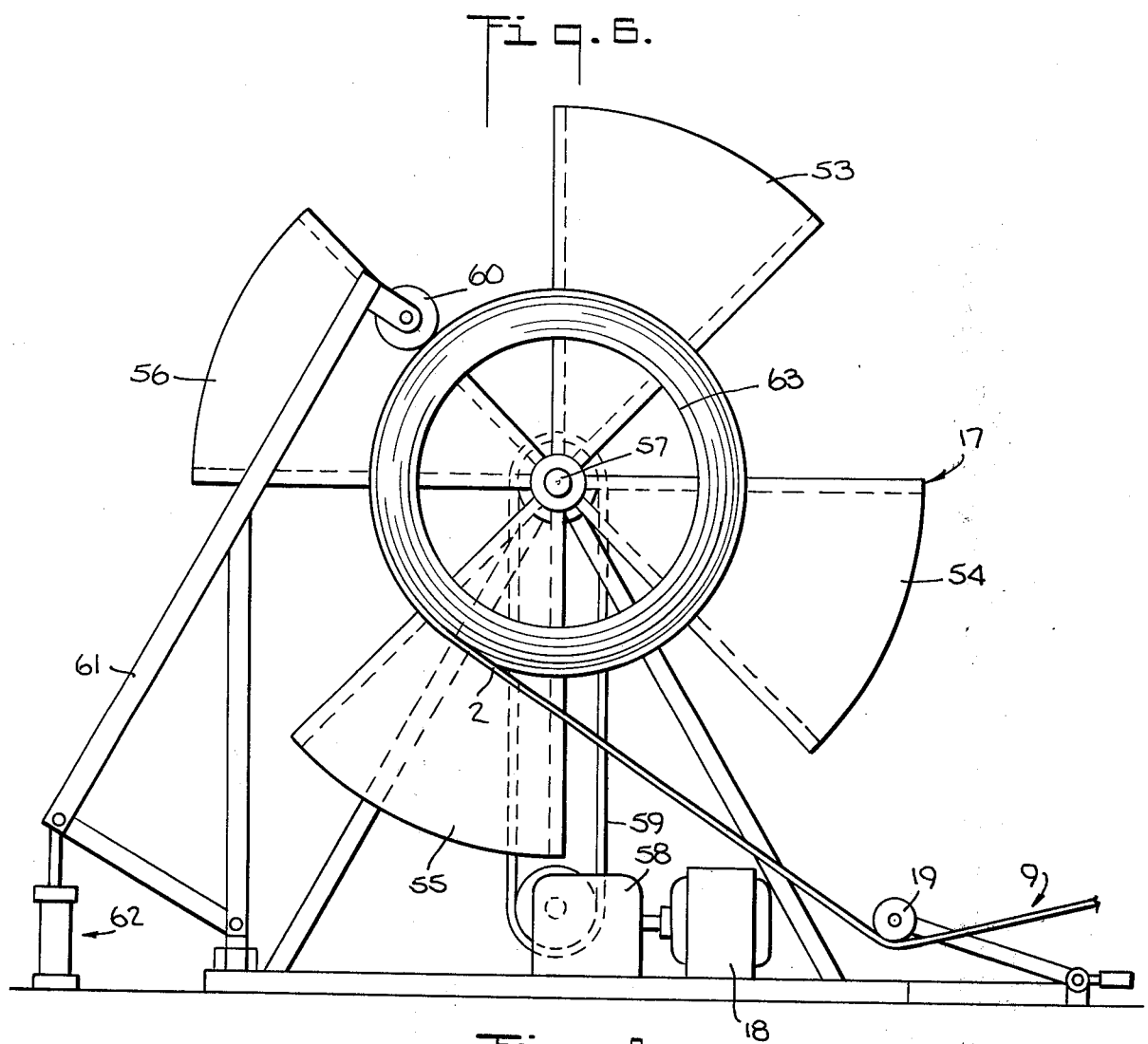
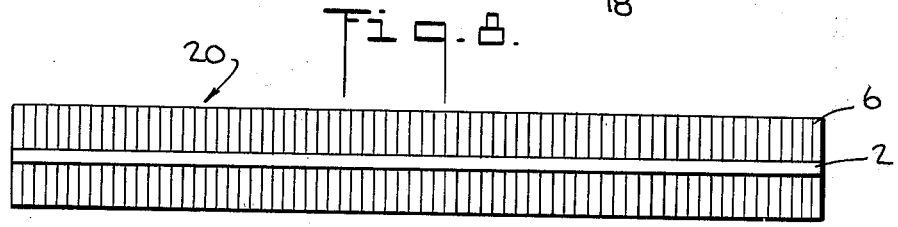
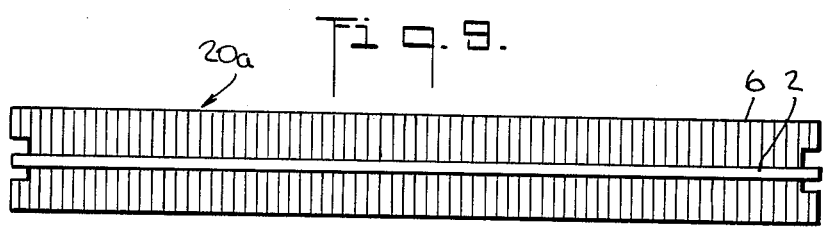
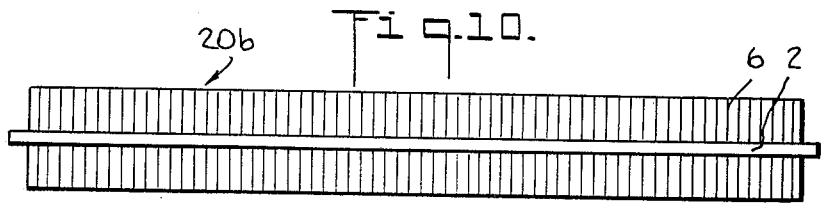

METHODS FOR THE MANUFACTURE OF HEAT EXCHANGER PANELS

This invention relates to methods and apparatus for the manufacture of heat exchange panels of the type sometimes known as solar panels and which comprise heat absorbing metal strips having metal tubing for conveying fluid secured thereto by welding.

Panels of the type to which the invention relates and the manufacture thereof are illustrated and described in the U.S. Pat. No. 4,136,272. In the methods described in U.S. Pat. No. 4,136,272 of high frequency welding techniques are used for joining the tubing and the metal sheet or strip, and several of the individual elements, each comprising a single tube joined to a strip, are placed side-by-side and joined to headers by solder.

Interest in the use of solar panels has increased in recent years, and there is a substantial demand for solar panels which are relatively inexpensive. While the methods described in U.S. Pat. No. 4,136,272 are satisfactory, there are manufacturing problems, such as ripples in the metal strip, the need for straightening the tubing, sizing of the tubing ends, etc., which are encountered and which must be overcome. In addition, a production line which will manufacture the panel elements at relatively high speed and at the lowest cost is desirable which means that manual handling of the tube and strip should be kept to a minimum.

It is one object of the invention to provide methods and apparatus for manufacturing solar panel elements at relatively high speed and with a minimum of manual handling of the tubing and the metal strip from the time that they are supplied to the apparatus to the time that a panel element, ready for assembly with headers, is completed.

Another object of the presently preferred embodiment of the invention is to reduce the manufacturing space required by having certain components of the apparatus perform dual functions, that is, to operate both during welding of tubing to the metal strip and during further treatment of the tube-strip combination to remove ripples to cut the combination to length, etc.

In the presently preferred embodiment of the invention, the tubing and strip are continuously advanced longitudinally and are welded together at a weld point by supplying high frequency, electric current thereto by contacts engaging the separated tubing and strip shortly in the advance of the weld point, in the manner described in U.S. Pat. No. 4,136,272 except that the welding current is not interrupted to interrupt the weld. In advance of the contacts, the tubing is straightened by conventional means and is then shaped in cross-section so that the faying surface of the tubing is of smaller radius than the radius of the tubing before shaping, thereby to increase the high frequency proximity effect. At the weld point, the faying surfaces of the tubing and the strip, heated to forge welding temperature are pressed together, and downstream of the weld point cooling fluid is applied to the so-welded tubing and strip as it is advanced over a trough which collects the cooling fluid.

Beyond the downstream end of the trough, there is apparatus for pulling the tube-strip combination and downstream of the pulling apparatus, there is a large, driven reel for collecting the tube-strip combination. The reel may hold several hundred feet of the tube-strip combination which is ready for cutting to length and other processing.

Between the reel and the pulling apparatus, there is conventional tube straightening apparatus, and if the strip is to be corrugated as described in the co-pending application of Wallace C. Rudd entitled "Head Exchanger Panels and Methods of Manufacture," filed Jan. 21, 1980 Ser. No. 113,790 and assigned to the assignee of this application, there is a corrugating device between the straightening apparatus and the pulling apparatus. Neither the straightening apparatus nor the corrugating device operates during the welding operation.

A further conventional tube straightener, which also does not function during the welding operation, is located between the pulling apparatus and the trough. The trough contains a carrier for receiving the tube-strip combination, which carrier is not used during the welding operation, and a cut-off saw is located between the trough and the last-mentioned tube straightener, the saw being inoperative during the welding operation.

After the desired length of the tube-strip combination is about accumulated on the reel, the welding operation is discontinued, and the reel is stopped with the trailing end of the combination between the reel and the tube straightener which is between the reel and the corrugating device or is stopped with the trailing end at such straightener. Such tube straightener, the corrugator, the tube straightener between the corrugator and the cut-off saw and the carriage are then activated and the tube-strip combination is fed through both tube straighteners, the corrugator and the pulling apparatus to the carriage along the same path that the combination followed during welding but in the reverse direction. When a length of the combination corresponding to the desired panel length is received on the carriage, the feed of the combination is stopped and the saw cuts a panel element of the correct length.

By means of a known type of stepping or indexing conveyor, the cut panel element is removed from the carrier in a direction transverse to the path of movement of the tube-strip combination and transferred to further processing apparatus described in greater detail in the co-pending application of Sidney Roberts entitled "Methods and Apparatus for the Processing of Heat Exchanger, Tube-Strip Elements," filed Feb. 19, 1980 Ser. No. 122,468 and assigned to the assignee of this application. Such apparatus has a first station where, if necessary, the panel is stretched and straightened as described in the co-pending application of Humfrey N. Udall entitled "Methods and Apparatus for the Manufacture of Heat Exchanger Panels," filed Feb. 19, 1980 Ser. No. 122,467 and assigned to the assignee of this application. The element is then moved to a second station where the ends of the tubing are enlarged, made round in cross-section and exteriorly machined and where portions of the strip adjacent to the tube ends are removed. The element is then moved to a third station where further portions of the strip adjacent to the ends of the tubing are modified, either by removal or bending. After such operation at the third station, the panel element is ready for assembly with headers in any desired manner. If the strip is corrugated as described previously and is sufficiently straight, the first station may be omitted, but if the strip is not corrugated or requires further straightening, the panel element is processed at the first station.

Other objects and advantages of the present invention will be apparent from the following detailed description of the presently preferred embodiments thereof, which description should be considered in conjunction with the accompanying drawings in which:

FIG. 1 is a diagrammatic, plan view of apparatus for manufacturing panel elements;

FIG. 2 is a diagrammatic, plan view of a modified embodiment of a portion of the apparatus illustrated in FIG. 1;

FIG. 3 is an enlarged, diagrammatic, side elevation view of the welding portion of the apparatus shown in FIG. 1;

FIG. 4 is an enlarged, diagrammatic, side elevation view of the cut-off portion of the apparatus shown in FIG. 1;

FIG. 5 is an enlarged, diagrammatic, side elevation view of the pulling and corrugating portion of the apparatus shown in FIG. 1;

FIG. 6 is an enlarged, diagrammatic, side elevation view of the storage reel forming part of the apparatus shown in FIG. 1;

FIG. 7 is an enlarged, diagrammatic, side elevation view of the panel element processing apparatus shown in FIG. 1; and FIGS. 8–10 are plan views of panel elements in various stages of processing.

The plant for manufacturing panel elements illustrated in FIG. 1 comprises a spool 1 carrying a coil of metal strip 2 which is supplied to a welding station 3 connected to a high frequency, electric current source 4. A spool 5 carrying a coil of metal tubing 6 supplies such tubing 6 to a well-known type of tube straightener 7 from which it passes to a tube shaper 8 and thence, to the welding station 3 where the tubing 6 is welded to the strip 2 normally, along the longitudinal center line of the strip 2. To conserve space and to permit relatively long runs, a coil of tubing 6 is used and to prepare the tubing 6 for proper alignment with the center line of the strip 2, the tube straightener 7 is employed in advance of the point at which current is supplied to the strip 2 and the tubing 6.

As the tubing 6—strip 2 combination 9, comprising the tubing welded substantially continuously to the strip 2 by heated and partially cooled metal of the two, leaves the welding station 3, the combination 9 is cooled by a fluid coolant supplied by the coolant source 10 in the form of a stream or spray. Coolant draining from the tubing 6—strip 2 combination 9 is received in a coolant trough 11 from which the coolant is removed and recirculated in a known manner.

The tubing-strip combination 9 then passes by a cut-off station 12 and a second known type of tube straightener 13 which are inoperative at this time. The combination 9 is pulled by pulling apparatus 14 of a known type and then, passes by an inoperative corrugator 15 and an inoperative third known type of tube straightener 16. The combination 9 is then collected on a reel 17 driven by a reel drive 18 and having a dancer roll 19 associated therewith, the reel 17 being driven at a rate synchronized with the rate at which the combination 9 is produced which may be several hundred feet per minute.

Production of the tubing-strip combination 9 may proceed until the reel 17 is filled, until the spools 1 and 5 have been exhausted respectively of the strip 2 and the tubing 6 or at an earlier time. Also, the capacity of the reel 17 may be such as to exhaust the supply of strip 2 and tubing 6 on several spools 1 and 5, in which case, production of the combination 9 may be interrupted for a short time while spools are changed and strip 2 and tubing 6 are fed to the apparatus from the new spools. Also, several reels 17 could be used, the production of the combination 9 being interrupted when one reel 17 becomes filled and until the feed of the combination 9 is transferred to another reel 17.

After production of the tubing-strip combination 9 at the welding station 3 is terminated, preferably, the operation of the reel 17 is discontinued when the trailing end of the combination 9 reaches at least the exit end of the third straightener 16, but if desired and if a short length of the combination 9 can be discarded or separately processed, the reel 17 may be stopped when the trailing end of the combination 9 reaches the pulling apparatus 14.

As described in the co-pending application of Wallace C. Rudd entitled "Heat Exchanger Panels and Method of Manufacture," filed Jan. 21, 1980 Ser. No. 113,790 and of Humfrey N. Udall entitled "Methods and Apparatus for the Manufacture of Heat Exchange Panels," filed Jan. 21, 1980 Ser. No. 113,796 now U.S. Pat. No. 4,277,871, both of which applications are assigned to the assignee of this application, the strip 2 has ripples therein after the tubing 6 has been welded thereto. It is desirable that such ripples be removed, and in the apparatus illustrated in FIG. 1, the ripples may be removed by corrugating the strip 2 at the corrugator 15, as described in such application Ser. No. 113,790 or by stretching the tubing 6 and the strip 2 at a hereinafter described stretching station as described in said application Ser. No. 113,796, now U.S. Pat. No. 4,277,871. For purposes of illustration, it will be assumed that the strip 2 is to be corrugated by the corrugator 15, but it will be understood that if the ripples are to be removed by stretching of the tubing 6 or both the tubing 6 and the strip 2, the corrugator 15 may be rendered inoperative or omitted.

After the desired amount of the tubing-strip combination 9 has been accumulated in the reel 17 and the reel 17 has been stopped, the tube straighteners 16 and 13, the corrugator 15 and the cut-off apparatus 12 are rendered operative, such as by manual adjustment thereof, and the movement of the combination 9 is reversed. Because the tubing 6 has been bent when the combination 9 was accumulated on the reel 17, the straightener 16 is desirable, and because the tubing 6 may be bent as the strip 2 is corrugated in the corrugator 15, the straightener 13 is desirable. However, in some cases, either or both straighteners may be omitted. The combination 9 is then advanced, in the reverse direction, through the straightener 16, where the tubing 6 is straightened, and through the corrugator 15, where the strip 2 corrugated as described in said application Ser. No. 113,790, and is pulled by the pulling apparatus 14, passes through the straightener 13, where the tubing 6 is again subjected to straightening and then, again overlies a platform in the coolant trough 11. Also, the corrugator 15 may be used to pull the combination 9 and in such case, the pulling apparatus 14 may be rendered inoperative.

When the formerly trailing end of the combination 9 which is now the leading end of the combination 9 strikes a stop at or near the right hand end of the trough 11, as viewed in FIG. 1, movement of the combination 9 is stopped and the cut-off apparatus, which may, for example, be a power driven saw cuts off a length of the combination 9 equal to the desired length of a panel element 20 (FIG. 8). The panel element 20 is then pushed on to a stepping or indexing conveyor which moves it to a stretching and straightening station 21, then to a machining or milling station 22 and then to a panel element modifying station 23 as described in the co-pending application of Sidney Roberts entitled "Methods and Apparatus for the Processing of Heat Exchanger, Tube-Strip Elements," filed Feb. 19, 1980 Ser. No. 122,468 and assigned to the assignee of this application.

When a panel element 20 has been removed from the platform in the trough 11, the combination 9 is again advanced to the right, as viewed in FIG. 1, and another panel element 20 is cut off by the apparatus 12. Thus, while a panel element 20 is being cut off, previously cut off elements 20 are being processed at least at the stations 22 and 23, and the process continues until the desired number of panel elements 20 have been processed or until the supply of the tubing-strip combination 9 on the reel 17 has been exhausted.

If the strip 2 has been corrugated at the corrugator 15 and the tubing 6 has been straightened at the straightener 13, it may not be necessary to process the panel element 20 at the stretching and straightening station 21, in which case, the station 21 may be rendered inoperative or omitted. On the other hand, even if the strip 2 has been so corrugated and straightened at the corrugator 15 and the straightener 13 respectively, it may still be desirable to process the panel element 20 at the station 21 for straightening purposes and also, to shape the tubing 6 end portions as described in said application Ser. No. 122,468. However, if the strip 2 has not been corrugated at the corrugator 15, the panel element 20 normally will be processed at the station 21.

The panel element 20 will have the appearance of the panel element 20a shown in FIG. 9 after it has been processed at the station 22 and will have the appearance of the panel element 20b shown in FIG. 10 after it has been processed at station 23. After processing at the station 21, the tubing 6 of panel element 20 will be substantially rectilinear, the strip 2 will lie substantially in a plane, any formerly visible ripples in the strip 2 will be removed and the end portions of the tubing 6 will be substantially circular in cross-section.

The embodiment of a plant for manufacturing panel element 20 described in connection with FIG. 1 is presently preferred because certain of the apparatus used during the production of the tubing-strip combination 9 is also used during the production of the panel elements 20. Furthermore, the tubing-strip combination 9 can be produced at relatively high rate and at a rate such that it is not practical to provide apparatus at the station 21-23 which can process panel elements 20 as fast as they are produced. However, if desired, the reel 17, and its associated apparatus, may be replaced by cut-off apparatus of a known type as illustrated in FIG. 2. In such an arrangement, the cut-off apparatus 12 and the parts in the trough 11 which are associated with the apparatus 12 would be omitted.

In the modified embodiment illustrated in FIG. 2, the operations up to the tube straightener 13 as the tubing strip combination 9 is produced and moves from right to left, as viewed in FIG. 1, are the same as those described hereinbefore. However, in the modified embodiment, the tube straighteners 13 and 16 are operative if straightening of the tubing 6 is required, and the pulling apparatus 14 is operative as the combination 9 passes there through in the right to left direction. Usually, the tubing 6 will not be rectilinear after it leaves the welding station 3 and requires straightening, but if it does not, the straightener 13 may be omitted. Also, if the strip 2 is to be corrugated, the corrugator 15 is operative when the combination 9 passes therethrough in such direction. Accordingly, as in the embodiment described in connection with FIG. 1, the tubing 6 of the combination 9 is straightened at the straightener 13 before the strip 2 is corrugated at the corrugator 15, and the tubing 6 is again straightened after corrugation of the strip 2 at the corrugator. Of course, if additional straightening of the tubing 6 at the straightener 16 is not necessary, the straightener 16 may be omitted. Also, the corrugator 15 may be used to pull the combination 9, in which case the pulling apparatus 14 may be omitted.

After the tubing-strip combination 9 leaves the straightener 16, it is received on a table 24 and engages an arm 25 which is part of a conventional "flying saw" apparatus represented by the rectangle 25. When the arm 25 is engaged by the leading end of the combination 9, the apparatus 26 advances with the tubing-strip combination 9, and at the same time, a power driven saw, which is a part of the apparatus 26, advances toward the combination 9 and cuts off a panel element 20 and retracts. The element 20 is removed from the table 24 and placed on a conveyor 27. If the rate of production of the tubing-strip combination 9 is sufficiently slow, a panel element 20 may be moved to the stations 21–23 as described in said application Ser. No. 122,468, but otherwise, the panel elements 20 would be moved to a storage position 28 by the conveyor 27. The panel elements 20 would then be removed from the storage position 28 and processed at the stations 21–23 as described in said application Ser. No. 122,468.

FIG. 3 illustrates a portion of the apparatus of FIG. 1 schematically but in detail greater than FIG. 1. The spool 1, carrying a coil of the strip 2, is rotatably mounted on a stand 29, and a spool 5, carrying a coil of the tubing 6, is rotatably mounted on a stand 30. The tubing 6 passes between a set of rollers 31 which are part of conventional tube straightening apparatus, and then, passes between one or more pairs of opposed, shaping rollers 32 having a peripheral groove 33 shaped to form the cross-section of the tubing 6 to the desired shape, e.g. an inverted tear-drop shape as described in such application Ser. Nos. 113,790 and 113,796 now U.S. Pat. No. 4,277,871.

The strip 2 is guided by a roll 34, and the strip 2 and the tubing 6 are brought together at a weld point where they are pressed together by a pair of rolls 35 and 36. In advance of the weld point W, the facing surfaces of the tubing 6 and the strip 2 are heated to welding temperature by supplying high frequency current of at least 3000 Hz, but preferably, at least 50 KHz, from a source 4 of such current, to the strip 2 and the tubing 6 by way of contacts 37 and 38 slightly engaging the strip 2 and the tubing 6 in advance of the weld point. After the tubing 6 and the strip 2 have been welded together, they pass over the trough 11 and are cooled by fluid from the coolant source 10.

With reference to FIG. 4, the trough 11 contains a platform 39 over which the tubing-strip combination 9 rides as it progresses from right to left as viewed in FIG. 4. At this time, the platform 39 serves merely to support the combination 9, and the cut-off apparatus 12, comprising a saw blade 40 driven by a motor 41 is inoperative. However, when the combination 9 moves from left to right, as viewed in FIG. 4, at the time that panel elements 20 are to be cut therefrom, the then leading end of the combination 9 strikes a stop 42 on the platform 30. The stop 42 is raised after the desired amount of combination 9 has been produced and before the movement of the combination 9 is reversed. The platform 39 is movable in the directions indicated by the double ended arrow 43 and is normally biassed into the position shown in FIG. 4. When the leading end of the combination 9 strikes the stop 42, the platform 39 moves to the right, and when a length of the combination 9 equal to the desired length of a panel element 20 is between the stop 42 and the plane of the saw blade 40, controls (not shown) operated by the platform 39, or an appendage thereon, cause the blade 40 to advance toward the combination 9 and cut-off a panel element 20 and also cause a hydraulically operated hold-down (not shown) to engage the combination 9 and hold it down against the platform 39 during the time that a panel element 20 is being cut-off. The blade 40 then retracts, the hold-down is raised and a hydraulically operated push-off device 44 pushes the panel 20 onto the conveyor described in said application Ser. No. 122,468.

FIG. 5 illustrates schematically the portion of the apparatus shown in FIG. 1 to the left of the cut-off apparatus 12. The straightening apparatus 13 and 16 for straightening the tube-strip combination 9 is of a known type comprising rolls, and are both inoperative when the tubing-strip combination 9 moves from right to left, except in the modified embodiment of FIG. 2, and are operative when the combination moves from left to right. The pulling apparatus 14 comprises an upper pair of pulleys 45 and 46 which support a belt 47 which engages the tubing 6 and the strip 2 and comprises a lower pair of pulleys 48 and 49 which support a belt 50 which engages the strip 2. One of the pulleys 45 and 46 and one of the pulleys 48 and 49 are driven by a reversible motor drive (not shown) to permit pulling of the tubing-strip combination 9 in either direction.

The corrugator 15 is described in detail in said application Ser. No. 113,790, and comprises gear-like rolls 51 which straddle and do not engage the tubing 6 but bear against the upper surface of the strip 2 at opposite sides of the tubing 6. The lower surface of the strip 2 bears against a roll 52 with a resilient surface, and as the combination 9 passes between the rolls 51 and 52, the strip 2 is corrugated as indicated in FIG. 5. If the strip 2 is not to be corrugated, the rolls 51 are moved away from the strip 2. In the embodiment described in connection with FIG. 1, the corrugator 15 is rendered inoperative by moving the rolls 51 away from the strip 2 while the combination 9 moves from right to left. In the embodiment described in connection with FIG. 2, the corrugator 15 is operative as the combination 9 is moved from right to left. By driving the rolls 51 by a suitable motor drive, the corrugator 15 may be used to pull the tubing-strip combination 9, and the pulling apparatus 14 may be omitted.

The reel 17 illustrated in FIG. 6 comprises four arms 53–56 extending from a driven shaft 57 and four corresponding arms axially spaced from the arms 53–56. The shaft 57 is driven by the motor 18 through a speed reducer 58 and a belt and pulley system comprising the belt 59. A roll 60 on an arm 61 is pressed against the lower surface of the strip 2 by a hydraulic piston and cylinder assembly 62 to cause the combination 9 to conform to the shape of the cylinder 63 which extends between the arms 53–56 and the corresponding axially spaced arms and which rotates with the shaft 57. The dancer roll 19 performs its usual function of taking up slack in the combination 9, the take-up speed of the reel 17 being kept as close as possible to the speed at which the combination 9 is produced by conventional synchronizing means (not shown).

FIG. 7 illustrates schematically the apparatus described in detail in said application Ser. No. 122,468 in association with the trough 11. The stations 21, 22 and 23 correspond respectively to the stations 11, 12 and 13 described in the last-mentioned application and the conveyor 27 corresponds to the conveyor which has the rails 4–7 and which is described in said last-mentioned application.

It will be noted from the description of the embodiment illustrated in FIG. 1 that the tubing-strip combination 9 follows the same path, during both the production of the combination 9 and during the corrugating of the strip 2 and cutting of the combination 9 into panel elements 20, thereby reducing the apparatus and the space required for the plant. Also, the pulling apparatus 14 and the trough 11 containing the platform 39 are used during both the production of the combination 9 and the manufacture of elements 20. In addition, the panel elements 20b are produced without manual handling of the tubing 6 and the strip 2 except when the tubing 6 and the strip 2 are initially fed to the apparatus at the welding station 3 and except when the end of a previously produced coil of tubing-strip combination 9 on the reel 17 is fed to the apparatus to the left of the cut-off apparatus 12.

Although the embodiment illustrated in FIG. 2 does not have the advantages of the use of certain parts of the apparatus during production of the tubing-strip combination 9 and during subsequent cutting thereof into panel elements 20, the embodiment of FIG. 2 eliminates the manual handling of the combination 9, and the time taken therefor, during the reversal of the direction of movement of the combination 9. In addition, it is unnecessary to render the tube straighteners 13 and 16 and the corrugator 15 inoperative during the production of the combination 9 and then render them operative when the strip 2 is to be corrugated and the combination 9 is to be cut into panel elements 20.

Both embodiments of the apparatus of the invention permit the manufacture of panel elements either with corrugations to remove ripples in the strip 2 as described in said application Ser. No. 113,790 or without corrugations but with stretching of the tubing 6 or the tubing 6 and the strip 2 to remove ripples in the strip 2 as described in said application Ser. No. 113,796. To change over from one type of element to the other it is merely necessary to render the corrugator 15 operative or inoperative. If the stretcher and straightener station 21 has not been used with corrugated panel elements, it may also be necessary to activate station 21 when uncorrugated panel elements are to be processed.

Although preferred embodiments of the present invention have been described and illustrated it will be apparent to those skilled in the art that various modifications may be made without departing from the principles of the invention.

What is claimed is:

1. A method for making a heat exchanger element which comprises:
   advancing metal tubing longitudinally thereof toward a weld point while simultaneously advancing a metal strip in its length direction toward said weld point for joining said tubing and said strip at said weld point, said strip being wide relative to the cross-sectional dimension of said tubing and being thin relative to its width;

heating said tubing and said strip at their surfaces to be joined to welding temperature by the time that they reach said weld point by supplying high frequency, electric current to said strip and said tubing in advance of the weld point;

pressing the tubing and the strip together at the weld point to form a weld therebetween and to form a tube-strip combination;

continuing the advance of the tube-strip combination along a path extending from said weld point to a collection point spaced from said weld point;

collecting the tube-strip combination at said collection point, and after a predetermined length thereof has been collected, discontinuing the advance of the tubing and strip and the welding together of tubing and strip;

thereafter, advancing the tube-strip combination in the reverse direction from said collection point toward said weld point and along said path; and as a predetermined length of the tube-strip combination reaches a predetermined position intermediate said collection point and said weld point, severing said length of said combination from the remainder of the tube-strip combination and removing said length of said combination from said path.

2. A method as set forth in claim 1 wherein said tubing is advanced from a coil thereof and further comprising straightening said tubing in advance of the weld point.

3. A method as set forth in claim 1 or 2 further comprising corrugating said strip intermediate said collection point and said predetermined position to remove any ripples present in the strip and as said tube-strip combination is advanced in the reverse direction toward said weld point.

4. A method as set forth in claim 3 further comprising straightening the tubing in advance of the corrugation of the strip and as the combination is advanced in the reverse direction toward said weld point.

5. A method as set forth in claim 4 further comprising straightening said tubing after the corrugation of the strip.

6. A method as set forth in claim 1 or 2 further comprising stretching at least the tubing of said length of said combination to remove any ripples present in the strip.

7. A method for making a heat exchanger element which comprises:

advancing metal tubing from a coil of such tubing and longitudinally of said tubing toward a weld point while simultaneously advancing a metal strip in its length direction toward said weld point for joining said tubing and said strip at said weld point, said strip being wide relative to the cross-sectional dimension of said tubing and being thin relative to its width;

straightening said tubing in advance of said weld point;

heating said tubing and said strip at their surfaces to be joined to welding temperature by the time that they reach said weld point by supplying high frequency, electric current to said strip and said tubing in advance of the weld point;

pressing the tubing and the strip together at the weld point to form a weld therebetween and to form a tube-strip combination and advancing the combination along a path beyond the weld point and in the same direction as the tubing and strip are advanced prior to the weld point;

advancing the tube-strip combination to cut-off apparatus along the path followed by the combination after it leaves the weld point but in a direction opposite to the direction in which said tubing and said strip are advanced to the weld point, cutting the combination to panel element lengths at said apparatus and removing each length from said apparatus; and in addition, performing one of the following two steps:

prior to cutting the combination to panel element lengths at said cut-off apparatus, the steps of straightening the tube of the tube-strip combination and corrugating said strip of the tube-strip combination to remove any ripples present in the strip;

when the strip has not been corrugated to remove any ripples therefrom, the step of stretching at least the tube of each panel element lengthwise after the element has been cut from the tube-strip combination to remove any ripples present in the strip and to straighten the tube.

* * * * *